United States Patent [19]
Griffith et al.

[11] Patent Number: 5,505,531
[45] Date of Patent: Apr. 9, 1996

[54] METHOD TO MAINTAIN BRAKE STACK CLOSURE DURING AUTOBRAKE APPLICATION

[75] Inventors: Thomas T. Griffith, Seattle; David T. Yamamoto, Bothell, both of Wash.

[73] Assignee: The Boeing Company, Seattle, Wash.

[21] Appl. No.: 440,161

[22] Filed: May 12, 1995

[51] Int. Cl.$^6$ .................................................. B60T 8/86
[52] U.S. Cl. ........................ 303/126; 303/20; 188/181 A
[58] Field of Search .................. 244/111, 97, 93, 244/112, 20, 105, 102, 103; 188/181 A, 181 T, 71.1, 71.5; 303/92, DIG. 3, DIG. 4, 9.61, 126, 178, 177

[56] References Cited

U.S. PATENT DOCUMENTS

| | | | |
|---|---|---|---|
| 3,847,445 | 11/1974 | Bissell et al. | 244/111 |
| 3,856,365 | 12/1974 | Steigerwald et al. | 303/93 |
| 3,917,356 | 11/1975 | DeVlieg | 303/93 |
| 3,920,204 | 11/1975 | Bissell et al. | 303/93 X |
| 3,920,278 | 11/1975 | Hirzel et al. | 244/111 X |
| 4,007,970 | 2/1977 | Romero | 303/93 |
| 4,078,845 | 3/1978 | Amberg et al. | 244/111 X |
| 4,412,291 | 10/1983 | Amberg et al. | 188/181 T X |
| 4,610,484 | 9/1986 | Amberg et al. | 303/93 X |
| 4,646,242 | 2/1987 | Valaas | 303/93 X |
| 5,024,491 | 6/1991 | Pease, Jr. et al. | 303/93 |

*Primary Examiner*—Douglas Butler
*Attorney, Agent, or Firm*—Thomas W. Hennen

[57] ABSTRACT

An aircraft autobrake system utilizes a hydraulic fluid pressure sensor to provide a signal proportional to brake hydraulic fluid pressure magnitude to a control system. The control system uses closed loop feedback of this pressure signal to control autobrake application. Such control avoids pressure or deceleration overshoot or undershoot caused by not achieving brake stack closure when deceleration control is applied. Upon landing, if autobrake control command plus the change in autobrake control command necessary to eliminate deceleration error is less than a specified minimum, then brake stack closure needs to be maintained. In that case, the control system determines hydraulic fluid pressure error and adjusts hydraulic fluid pressure to eliminate such pressure error, using closed loop feedback. Upon elimination of pressure error, indicating brake stack closure, deceleration control then applies autobraking to slow the aircraft without pressure or deceleration overshoot or undershoot. If upon landing, the autobrake control command plus the change in autobrake control command necessary to eliminate deceleration error is greater than a specified minimum, then deceleration control is used to apply braking and decelerate the aircraft.

1 Claim, 3 Drawing Sheets

METHOD TO MAINTAIN BRAKE STACK CLOSURE DURING AUTOBRAKE APPLICATION

BACKGROUND OF THE INVENTION

1. Field of the Invention

The present invention pertains to a method for braking an aircraft during landing rollout. With greater particularity, the present invention pertains to a method of applying braking force so that the aircraft will not experience hydraulic fluid pressure overshoot or deceleration overshoot, regardless of the model and internal volume of the braking system installed on the aircraft. With greatest particularity, the present invention pertains to such a method that uses an analog pressure sensor and closed loop feedback control of hydraulic fluid pressure to maintain brake stack closure condition and select the appropriate control law for incrementing the autobrake control command.

2. Description of the Related Art

Aircraft brakes of the type used in large commercial airliners typically use a series of rotating members that turn with the aircraft wheels (rotors) interleaved with stationary members (stators) that do not turn, not unlike a multiple disk clutch. Pressure forcing the rotors and stators together producing a compressed stack of rotors and stators develops frictional forces between the rotors and stators that resists rotation of the rotors and slows the aircraft. The number of rotors and stators is chosen to achieve the frictional surface area required to develop the torque necessary to slow down or stop the aircraft smoothly and within a reasonable distance. Retarding forces are generated only after the rotors and stators are compressed to the point they are in firm contact with one another, the point known as "brake stack closure."

To prevent the brakes dragging, hydraulic force member 22 controlling compression of the rotors and stators must be held in a retracted position short of brake stack closure when braking force is not desired. Because large commercial airliners are heavy, braking systems for those airliners frequently require large force inputs to achieve sufficient retarding force to slow or stop the forward motion.

Autobraking systems have been devised to apply brake force automatically on landing according to a predefined schedule, and in response to aircraft deceleration from the combined effects of brakes, engine thrust reversers and braking flaps. Also, anti-skid systems have been devised and implemented to prevent locked wheels or skids when landing surfaces are slippery.

If an aircraft autobraking system applies too much or not enough hydraulic fluid pressure than the designers intended at any point in the landing sequence, the autobraking system is said to have a pressure overshoot or undershoot. Similarly, if aircraft deceleration is greater than or less than the designers intended at any point in the landing sequence the autobraking system is said to have a deceleration overshoot or undershoot. These conditions can interfere with a smooth landing rollout as well as cause discomfort and apprehension to passengers and crew.

In the past, aircraft autobraking systems have typically used rotors and stators manufactured from steel, and have used open loop control systems to control autobraking function to achieve brake stack closure. These autobraking systems normally do not experience the problems of deceleration overshoot where the brakes generate more stopping torque than desired and so open loop control systems were adequate to achieve the initial stack closure. However, when modern commercial aircraft began using lighter weight carbon fiber rotors and stators, overshoot and undershoot problems became significant enough to demand solutions.

Usually, pressure overshoot is caused by the autobraking control system being unaware of the exact relation of the rotors and stators to brake stack closure, and applying a scheduled though inappropriately large amount of pressure to the hydraulic system as the brakes are applied.

Previous autobrake systems use carefully tailored open-loop valve command profiles (brake fill spike) to set initial brake pressure at the point where the brake friction elements are just beginning to produce torque (brake stack closure). This is achieved by metering a preset volume of brake fluid into the brakes from the autobrake pressure control valve.

Variability in the volume of the brakes and in the response of the autobrake pressure control valve often results in an initial brake pressure which is above or below the desired value. When the initial pressure is too high (brake overfill), an objectionable deceleration overshoot results from the sudden onset of brake torque. When the initial pressure is too low (brake underfill), subsequent closed-loop deceleration control commands an increasing pressure rise rate to the brakes because the lack of torque output results in an increasingly large error between commanded deceleration and actual deceleration. This results in brake pressure overshoot with accompanying deceleration overshoot at the moment of stack closure.

The problem of obtaining correct brake stack closure using an automated braking system is compounded on some modern airplanes because the aircraft manufacturer offers the airplanes with optional braking systems from different brake system manufacturers. The volume of hydraulic fluid required to fill the brake system sufficient to move the rotors and stators to the brake stack closure point may be much larger for one style of brake than for another. Therefore, if the control system doesn't take brake system design differences between manufacturers into account, the use of a preset hydraulic fluid volume that works well to achieve brake stack closure for one brake style may result in deceleration overshoots with the other. Aircraft manufacturers regard it as advantageous to have a single autobraking control system rather than several tailored to the design of each different brake manufacturer's braking system.

A related problem occurs when the autobrake system commands the brake to remain at brake stack closure pressure when the required deceleration is met or exceeded by other retarding devices such as thrust reversers or wing spoilers. The existing technology for manufacturing autobrake pressure control valves does not permit the precision necessary to closely control output pressure during open-loop command. As a result, the brake pressure may be set too high causing objectionable brake drag, or too low which results in deceleration overshoot when the autobrake control system returns to closed-loop deceleration control.

Prior attempts to obtain brake stack closure relied on the selection of an open loop brake fill spike that would just fill the volume of an average set of brakes and a shape of the fill spike command (current versus time) that would minimize the effect of variations between autobrake valves. Variations in the actual volume of the brake and in the performance of the autobrake valve still caused some airplanes to experience objectionable deceleration behavior. A second approach used a different fill spike for each style of brake. This requires configuration control to differentiate between autobrake controllers with different software versions so that the controller can be matched to brake style installed.

Prior attempts to hold brake pressure at the stack closure level, while deceleration is being provided by thrust reversers, have relied on setting the brake pressure above the brake stack closure pressure of a high brake stack closure brake by a specified amount determined by analysis to ensure that all brakes are closed. This reduces the probability of deceleration overshoot by preventing brake underfill. A side effect of this technique is objectionable brake drag. Dragging brakes generate excessive deceleration, increase brake wear, and require longer waiting time to allow the brake temperature to drop to acceptable levels before the next take-off. The latter adversely affects the airlines' ability for quick turn-around for "short hop" flights. These problems and others have been solved by the present invention.

SUMMARY OF THE INVENTION

This invention improves the autobrake control system performance by eliminating deceleration overshoot and undershoot during landing rollout and allows the use of a single software algorithm to control a broad range of brake sets with different hydraulic compliance volumes. This invention uses pressure feedback control to compensate for variations during brake fill. The brake fill spike is designed to fill the smallest volume brake to just below stack closure thus avoiding the problem of brake overfill. Pressure feedback control is performed after the brake fill spike by comparing the pressure in the brake with the desired pressure level and continuing to fill until the nominal stack closure pressure is reached. Once the stack closure pressure level is reached, deceleration feedback is used to control brake pressure.

In addition, this invention uses pressure feedback to maintain brake pressure at the stack closure level while the airplane deceleration is being met by thrust reversers. Deceleration control is always active and when it reduces the control command to its minimum, pressure feedback control is used to regulate brake pressure at a specified target pressure to maintain brake stack closure. The pressure feedback control algorithm uses pressure information obtained from a pressure transducer located on the autobrake valve module. The controller is an integral control law that minimizes the difference between the actual and target brake pressures.

Hence, it is an object of the present invention to provide an autobraking system that achieves brake stack closure, while avoiding pressure overshoot or undershoot, and deceleration overshoot or undershoot. A further object of the invention is to utilize pressure feedback control to regulate brake hydraulic fluid pressure according to an algorithm that minimizes the difference between the actual brake pressure and a predefined target brake pressure corresponding to brake stack closure. Yet another object of the invention is to provide a common control system for use with brake systems made by different manufacturers.

BRIEF DESCRIPTION OF THE DRAWING

The invention further resides in certain novel features of construction, combinations, and arrangements of parts, and further objects and advantages of the invention will be apparent to those skilled in the art to which the invention pertains from the following description of the preferred embodiment thereof described with reference to the accompanying drawing figures, which form a part of this specification, wherein.

DETAILED DESCRIPTION OF THE PREFERRED EMBODIMENT

Figure 1:
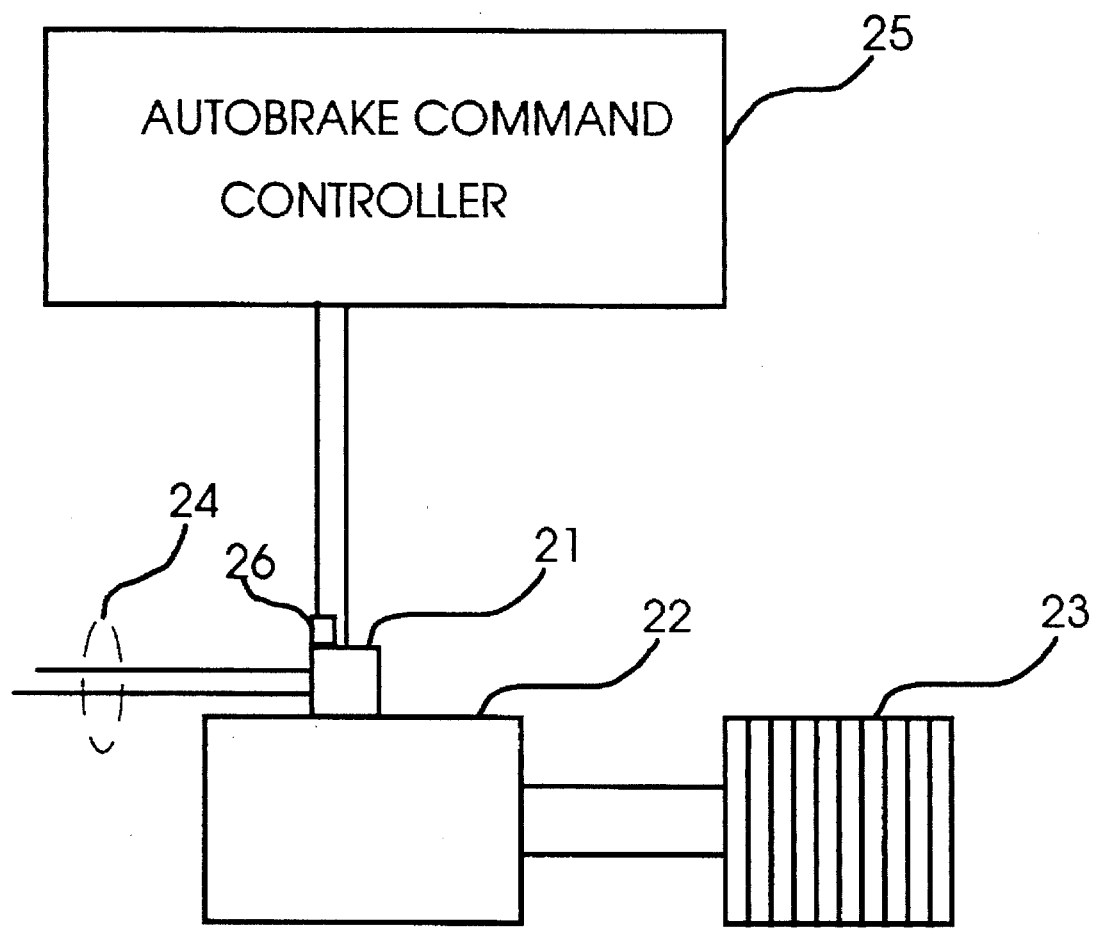
FIG. 1 is a mechanical schematic illustration of an aircraft autobraking system according to the invention.

Referring now to the drawing wherein like reference characters designate like parts and elements throughout the several drawing figures, there is shown schematically in FIG. 1 a typical aircraft braking system. This braking system comprises friction element 23, itself further comprising alternately positioned or stacked rotors which turn with the aircraft wheels, and stators which are stationary relative to landing gear structure and do not turn with the aircraft wheels. Friction element 23 is acted upon by hydraulic force member 22 to compress the rotors and stators in friction element 23 to achieve brake stack closure, the state where space between adjacent rotors and stators has been removed and the rotors and stators bear frictionally upon one another. At this point, any additional compressive force will cause the generation of frictional torque which resists rotation of the aircraft wheel being braked.

Hydraulic fluid lines 24 communicate hydraulic fluid pressure between hydraulic force member 22 thorough servo valve 21, and a high pressure source and return (not shown). Autobrake command controller 25 applies a signal to servo valve 21 to control action of hydraulic force member 22 according to a preestablished braking schedule and in response to hydraulic fluid pressure and aircraft deceleration. Hydraulic fluid pressure sensor 26 senses actual hydraulic fluid pressure at any point in time and provides this information to autobrake command controller 25.

Hydraulic fluid pressure sensor 26 is an industry standard pressure transducer for measuring hydraulic fluid pressure in the range of zero to four thousand pounds per square inch, and outputting a proportional signal of between four and twenty milliamp. Although this invention has been implemented using such a pressure sensor, there are a wide variety of transducers available that could be used in the present invention. Similarly, servo valve 21 is an industry standard valve which is activated by a zero to eight milliamp signal to control zero to three thousand pounds per square inch of hydraulic fluid pressure. Of course, there are a wide variety of other valves that could be used in the present invention.

Figure 2:
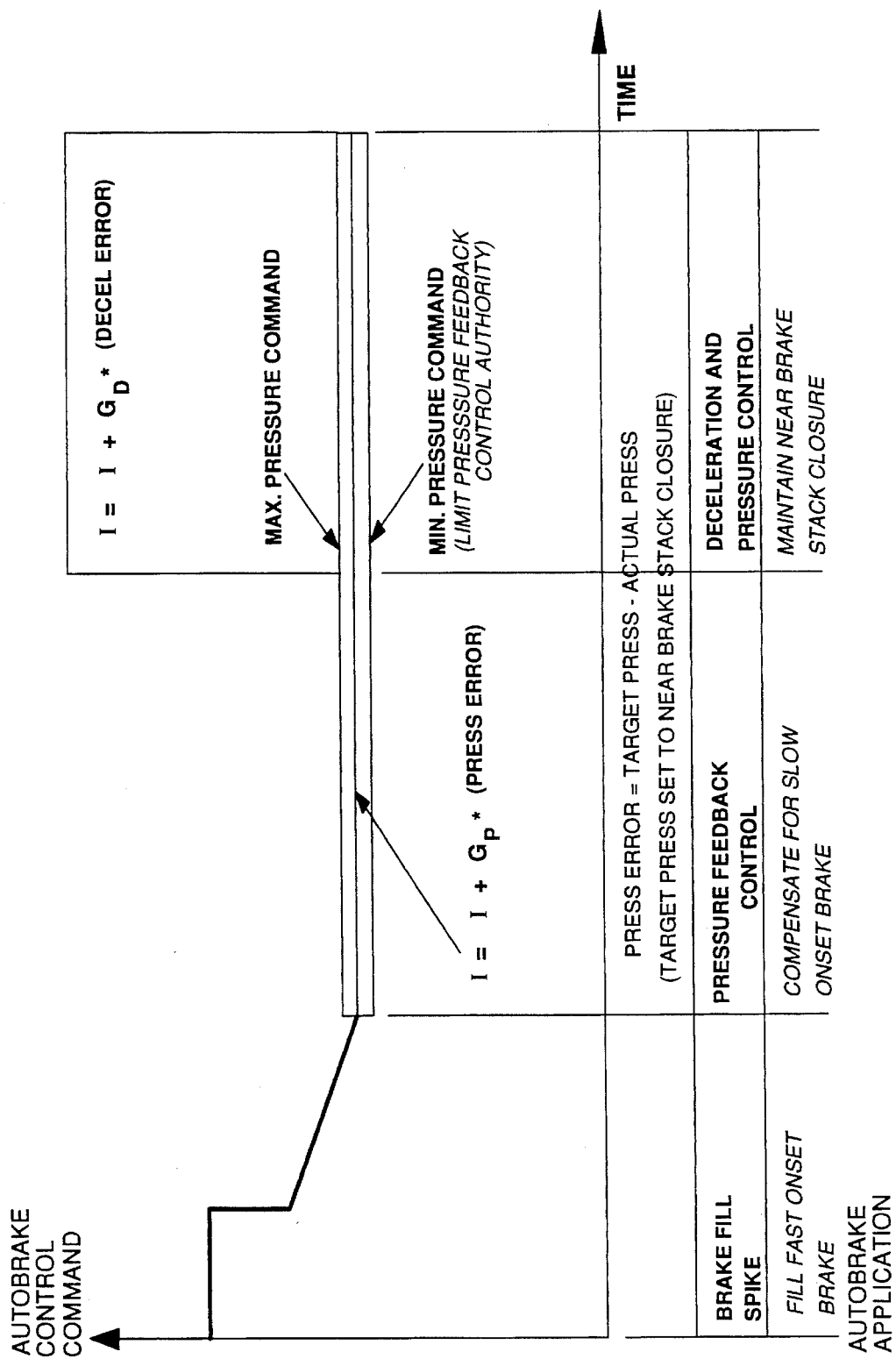
FIG. 2 is a graph of the Autobrake Control Command plotted against time to illustrate a predefined schedule suitable for use in the invention.

FIG. 2 is a graph depicting the autobrake control regions inherent in autobrake operation. For purposes of FIGS. 2 and 3, the following definitions apply:

| | |
|---|---|
| I | Autobrake Control Command |
| $I_{MIN}$ | Minimum Autobrake Control Deceleration Command |
| $I_{OUT}$ | Autobrake Control Command Output |
| $I_{PMAX}$ | Maximum Autobrake Control Pressure Command |
| $I_{PMIN}$ | Minimum Autobrake Control Pressure Command |
| $G_P$ | Pressure Control Gain |
| $G_D$ | Deceleration Control Gain |
| D | Deceleration |
| $\Delta I_D$ | Change In Autobrake Control Command Necessary To Eliminate Deceleration Error |
| $\Delta I_P$ | Change In Autobrake Control Command Necessary To Eliminate Pressure Error |
| P | Pressure |

Deceleration Error is the difference between the predetermined aircraft deceleration and actual aircraft deceleration at any time after aircraft touchdown during rollout.

Pressure Error is the difference between the predetermined brake hydraulic fluid pressure indicative of brake stack closure and the actual hydraulic fluid pressure at any time after aircraft touchdown during rollout.

Tolerance is a preselected value of autobrake control command increment that allows for variation in $1_{MIN}$ due to a noisy input signal (as inherent in real systems).

For example, the graph is divided into three distinct regions. The first region on the left-hand side of FIG. 2, is the Brake Fill Spike region. This region illustrates the autobrake control command necessary to initially fill the brake system hydraulic force member 22 with brake fluid sufficient to bring frictional element 23, both rotors which turn with the aircraft wheels, and stators which are stationary relative to landing gear structure and do not turn with the aircraft wheels, to brake stack closure. Brake stack closure alone is not sufficient to generate significant torque for resisting aircraft motion, but is the point where additional autobrake command will cause a proportional resisting torque. Maintaining brake stack closure during landing rollout allows more accurate application of automated braking force based on deceleration of the aircraft. Maintaining brake stack closure also avoids setting the brake hydraulic fluid pressure so high that the brakes experience pressure or deceleration overshoot, and the brakes continue to drag and generate heat, even after sufficient aircraft deceleration has been achieved.

The autobrake control command profile in the Brake Fill Spike region is designed to rapidly fill the internal volume of hydraulic force member 22 with hydraulic fluid. Since braking systems are designed and supplied by different manufacturers, they typically do not have exactly the same internal volumes. Since a particular airplane optionally may have a braking system supplied by any of the different braking system manufacturers, the brake fill spike is designed to rapidly fill the braking system selected from the available choice of brake equipment designs having the smallest internal hydraulic fluid volume.

By tailoring the brake fill spike to the hydraulic force member 22 having the smallest internal volume as compared to larger hydraulic force members supplied by other manufacturers, a schedule of autobrake control command application in the Brake Fill Spike region may be standardized so that a single autobrake control system algorithm may be used regardless of the brand of brake system chosen for installation on a particular aircraft. If the brake fill spike were tailored to one of the larger internal volumes, then when applied to the braking system having a smaller internal volume, the brake fill spike would overfill the internal volume and cause pressure overshoot, resulting in harsh braking.

The second region in FIG. 2 is the Pressure Feedback Control region. This region compensates in those situations where the actual braking system installed on an aircraft has a larger internal hydraulic fluid volume than does the smallest braking system available for that aircraft, to which the autobrake command controller brake fill spike is tailored. The autobrake command control measures actual hydraulic fluid pressure in the braking system and determines the difference between actual pressure and scheduled pressure at the point of brake stack closure. If actual pressure is less than or greater than a predefined pressure at the point of brake stack closure, the autobrake command controller issues a command to adjust hydraulic fluid pressure to the point of brake stack closure to thereby achieve a known relationship between the rotors and stators. When this occurs, the pressure authority in the autobrake command controller is held between narrow limits above and below the brake stack closure point. This means that autobraking command based on hydraulic fluid pressure will be held to a narrow range, although an autobraking command based on deceleration will be superimposed on the pressure component, as is seen in the next region.

The third region on the chart in FIG. 2 is the Deceleration and Pressure Control region where brake stack closure is maintained and pressure authority in the autobrake control system is limited between narrow limits both above and below the defined pressure corresponding to brake stack closure. In addition, the autobrake control system determines aircraft deceleration error, the difference between actual deceleration and scheduled deceleration, and applies an additional autobrake control command to achieve proper deceleration.

Referring again to FIG. 2, it is clear that during landing rollout, autobrake control command in the Pressure Feed Back region is initially set to produce a predefined pressure and then based upon measurement of actual hydraulic fluid pressure, the autobrake control command is incrementally adjusted by the product of the pressure gain, $G_P$, and the magnitude of pressure error. Similarly, in the Deceleration and Pressure Control region of the chart in FIG. 2, the autobrake control command is incremented or adjusted as necessary by the product of the deceleration gain, $G_D$, multiplied by the deceleration error.

Figure 3:
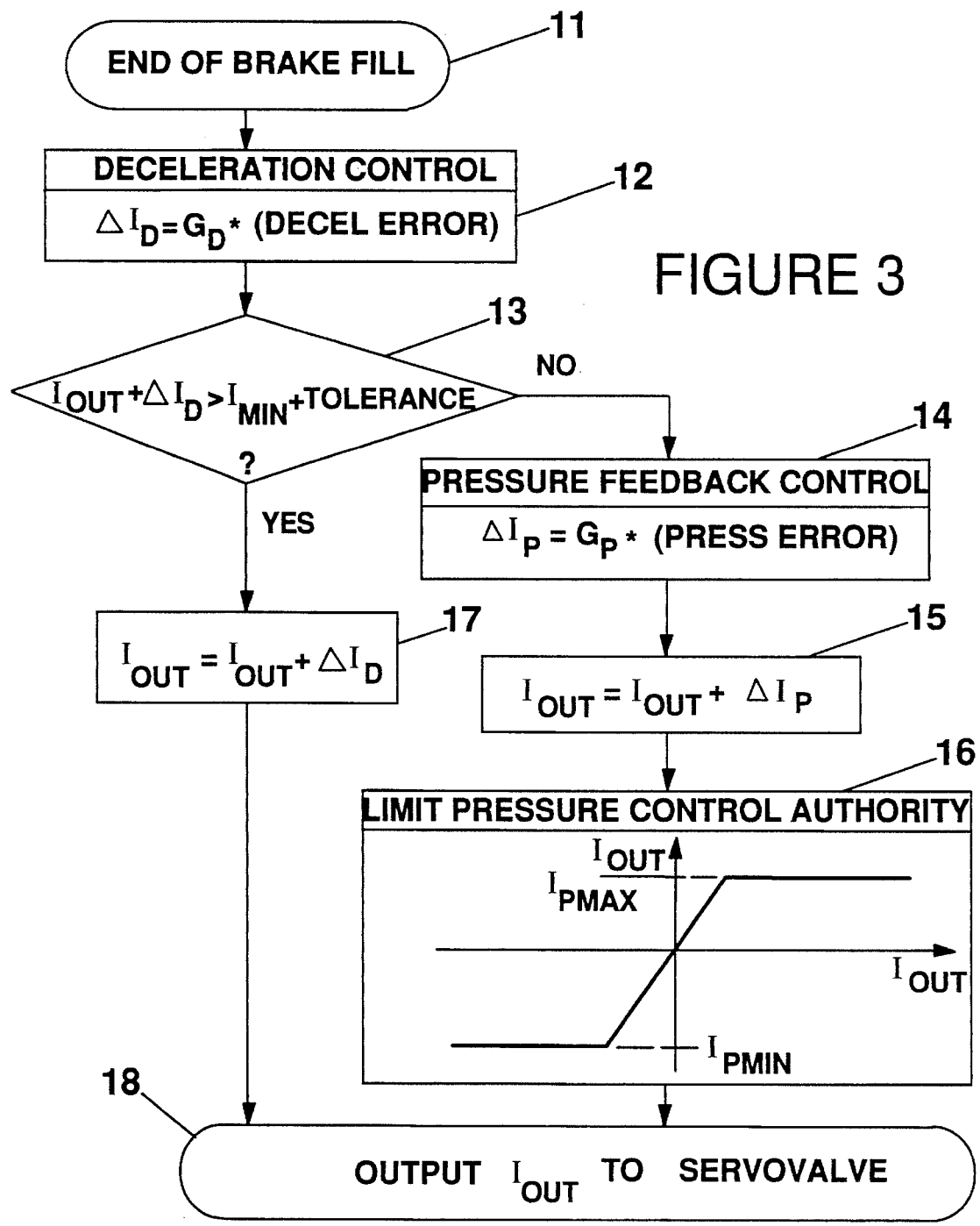
FIG. 3 illustrates an Autobrake Pressure Feedback Control block diagram according to the invention.

Referring now to FIG. 3 there is shown an Autobrake Pressure Feedback Control Block Diagram which illustrates the logic inherent in the present invention. Upon initiation of autobrake application, the hydraulic fluid force member 22 is initially filled to a predetermined level with hydraulic fluid as illustrated by rounded box 11 in FIG. 3. Autobrake control system 25 then immediately measures actual aircraft deceleration and compares it with scheduled deceleration to determine the instantaneous amount of deceleration error. The formula 1) shown in box 12 of FIG. 3 illustrates how deceleration error is multiplied by the system gain based on deceleration, $G_D$, to equal the change in autobrake command necessary to eliminate the deceleration error.

$$\Delta 1_D = G_D \times \text{(Deceleration Error)} \qquad 1)$$

This amount is then combined with the initial autobrake control command output, $1_{OUT}$, and is then compared with a predetermined minimum autobrake control command including a selected tolerance value, $1_{MIN}$ plus Tolerance, to determine if the autobrake command plus increment based on deceleration is greater than the specified autobrake command plus tolerance. When transitioning from deceleration control to pressure control this condition must be satisfied for a minimum of 0.25 seconds in order to complete the transition. This requirement serves to "de-bounce" the input signal and distinguish real signals from noise signals.

$$1_{OUT} + \Delta 1_D > 1_{MIN} + \text{TOLERANCE} \qquad 2)$$

If this comparison yields a "NO" answer, meaning that the initial autobrake command and increment based on deceleration are below the minimum autobrake command for this airplane at this point in the landing sequence, then brake stack closure should be maintained.

At this point the autobrake control determines actual hydraulic fluid pressure and compares actual hydraulic fluid pressure with predetermined hydraulic fluid pressure corresponding to brake stack closure and uses this value of pressure error in the formula of box 14 in FIG. 3.

$$\Delta l_p = G_p \times \text{(Pressure Error)} \quad 3)$$

Gain based on pressure, $G_p$, is multiplied by the pressure error to yield the amount that the autobrake control command needs to be incremented or adjusted to eliminate this pressure error and arrive at brake stack closure. Autobrake command controller 25 then uses this amount to increment the autobrake control command output $I_{OUT}$, thereby raising the autobrake command output, $l_{OUT}$, to a higher level and increasing hydraulic pressure to the point necessary to maintain brake stack closure.

$$l_{OUT} = l_{OUT} + \Delta l_p \quad 4)$$

A limit is then placed on hydraulic fluid pressure control authority in autobrake command controller 25 so that autobrake control commands based on hydraulic fluid pressure are maintained between narrow limits above and below the predetermined hydraulic fluid pressure corresponding to brake stack closure. This is shown in box 16.

$$l_{OUT} = l_{OUT} + \Delta l_D \quad 5)$$

Autobrake control command $l_{OUT}$ is output to servo valve 21 which allows the commanded amount of hydraulic fluid pressure from hydraulic fluid lines 24 to flow into hydraulic force member 22 which then acts on friction element 23 to produce friction to decelerate the aircraft.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. In an aircraft braking system including a friction element, a hydraulic force producing means for activating the friction element, and a system controller, a method for maintaining brake stack closure during automated brake application, comprising the steps of:

filling the braking system with a predetermined amount of hydraulic fluid selected to bring a breaking mechanism to the point of brake stack closure;

measuring instantaneous aircraft deceleration;

determining deceleration error by comparing measured aircraft deceleration with a predetermined aircraft deceleration;

determining the change in autobrake control command necessary to eliminate the deceleration error;

comparing the value of the sum of autobrake control command plus the change in autobrake control command necessary to eliminate deceleration error, with a predetermined minimum autobrake control command plus a predefined tolerance, to determine which is greater;

if the sum of autobrake control command plus change in autobrake control command necessary to eliminate deceleration error, is less than the minimum autobrake control command plus a predefined tolerance, then measuring brake hydraulic fluid pressure;

determining brake hydraulic fluid pressure error by comparing measured brake hydraulic fluid pressure with a predetermined brake hydraulic fluid pressure corresponding to brake stack closure;

determining the change in brake hydraulic fluid pressure necessary to eliminate the pressure error;

adjusting brake hydraulic fluid pressure by the amount necessary to eliminate the pressure error;

maintaining brake hydraulic fluid pressure control authority between predefined limits for a predefined length of time;

again determining deceleration error; and incrementing autobrake control command by an amount necessary to eliminate deceleration error.

* * * * *